(12) United States Patent
Volmer et al.

(10) Patent No.: US 12,398,693 B2
(45) Date of Patent: Aug. 26, 2025

(54) METHOD FOR CONTROLLING A WIND TURBINE DURING YAW OPERATION

(71) Applicant: General Electric Renovables Espana, S.L., Barcelona (ES)

(72) Inventors: Matthias Volmer, Salzbergen (DE); Till Hoffmann, Salzbergen (DE); Diego Navarro, Barcelona (ES); Ketan Daniel Tigga, Eastleigh (GB); Lothar Hendus, Salzbergen (DE)

(73) Assignee: GE Vernova Renovables Espana, S.L., Barcelona (ES)

( * ) Notice: Subject to any disclaimer, the term of this patent is extended or adjusted under 35 U.S.C. 154(b) by 0 days.

(21) Appl. No.: 18/761,603

(22) Filed: Jul. 2, 2024

(65) Prior Publication Data
US 2025/0012251 A1 Jan. 9, 2025

(30) Foreign Application Priority Data

Jul. 5, 2023 (EP) ..................................... 23382694

(51) Int. Cl.
*F03D 7/02* (2006.01)
(52) U.S. Cl.
CPC ......... *F03D 7/0204* (2013.01); *F03D 7/0244* (2013.01)
(58) Field of Classification Search
CPC .............................. F03D 7/0204; F03D 7/0244
See application file for complete search history.

(56) References Cited

U.S. PATENT DOCUMENTS

| | | | |
|---|---|---|---|
| 8,890,349 B1* | 11/2014 | Lynch | F03D 7/0204 290/55 |
| 10,100,810 B2* | 10/2018 | Frederiksen | F03D 7/0244 |
| 11,391,263 B2* | 7/2022 | Hovgaard | F03D 7/042 |
| 11,614,072 B2* | 3/2023 | Nohara | F03D 7/0224 416/1 |
| 2023/0314130 A1* | 10/2023 | Bunge | F03D 17/00 702/189 |

FOREIGN PATENT DOCUMENTS

| | | |
|---|---|---|
| CN | 112228275 A | 1/2021 |
| CN | 113931796 A | 1/2022 |
| WO | WO2023/117025 A1 | 6/2023 |

OTHER PUBLICATIONS

European Search Report Corresponding to EP23382694 on Dec. 5, 2023.

* cited by examiner

*Primary Examiner* — Justin D Seabe
(74) *Attorney, Agent, or Firm* — Dority & Manning, P.A.

(57) ABSTRACT

The present disclosure relates to methods (100, 200, 300) for controlling a wind turbine (10) during a yaw operation. The present disclosure further relates to control systems (92) for wind turbines and to wind turbines (10). A method for operating a wind turbine (10) during yaw operation comprises operating one or more yaw drives (35) to rotate the nacelle (16) with respect to the tower (15). In addition, the method comprises predicting an end of the yaw operation and, in response to predicting an end of the yaw operation, actuating a hydraulic brake (94) before the predicted end.

15 Claims, 7 Drawing Sheets

METHOD FOR CONTROLLING A WIND TURBINE DURING YAW OPERATION

The present disclosure relates to wind turbines, and more particularly, to yaw systems and methods for controlling yaw systems.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a moment that is normally transmitted through a rotor shaft to a generator, either directly ("directly driven" or "gearless") or through the use of a gearbox. This way, the generator produces electricity which can be supplied to the electrical grid.

The wind turbine hub may be rotatably coupled to a front of the nacelle. The wind turbine hub may be connected to a rotor shaft, and the rotor shaft may then be rotatably mounted in the nacelle using one or more rotor shaft bearings arranged in a frame inside the nacelle. The nacelle is a housing arranged on top of a wind turbine tower that may contain and protect the gearbox (if present) and the generator (if not placed outside the nacelle) and, depending on the wind turbine, further components such as a power converter, and auxiliary systems.

Wind turbines usually comprise a yaw system for rotating the rotor and the nacelle with respect to the tower about a longitudinal axis of the tower.

During power production operation, the direction of the wind may change. When the wind turbine rotor is misaligned with respect to the wind direction, the yaw system rotates the nacelle about a longitudinal axis of the tower to reach an alignment with the wind. The determination that the nacelle and rotor are no longer aligned with the prevailing wind direction may be made based e.g. on a weather vane mounted on the nacelle. However, other methods based on measuring loads and/or oscillations are also known. Generally, the yaw system may be activated if the prevailing wind direction deviates from the rotor and nacelle orientation by more than a predefined threshold (e.g. 5°, 7°, or 10° or more) for at least a predetermined period of time. A predetermined period of time may be 1 minute, 5 minutes, 10 minutes or more. Seconds to minute averages, e.g. 3 second, 10 second, 1 minute, or 5 minute averages, may for example be determined to calculate the direction of the prevailing wind speed.

Apart from power production, other modes of operation may also involve rotation of the nacelle about the longitudinal axis of the tower. A non-limiting example is a cable untwist operation. Wind turbines comprise cables (power cables and/or other cables) that may be fixed at their ends, e.g. from a component in the nacelle to some other component at some point in the tower. As a result of the previously mentioned rotation during power production operation, the cables may become twisted. Generally, a twist limit exists beyond which the cables may be damaged. Before such limit is reached, the cables need to be untwisted. To this end, an untwist operation of a wind turbine may comprise stopping the wind turbine and yawing the nacelle until a certain predetermined orientation is reached in which the cables are not substantially twisted.

The yaw system normally performs this rotation of the nacelle by means of a yaw drive that includes a plurality of motors, e.g. electric or hydraulic motors, with suitable gearboxes for driving gears (pinions) that mesh with an annular gear or gear ring attached to the nacelle or to the wind turbine tower. The nacelle can thus be rotated around the tower's longitudinal axis in or out of the wind direction. The rotatable connection between the wind turbine tower and the nacelle is called a yaw bearing. The yaw bearing can be of the roller or gliding type.

Normally, when the rotor is positioned according to the desired orientation, e.g. aligned with the wind direction in case of power production operation, the yaw system maintains the orientation by means of brakes, e.g. hydraulic brake calipers and/or motor brakes of the yaw motors. These brakes can be activated and deactivated by the wind turbine control system.

In particular, it is known for the wind turbine controller to activate and deactivate the different components in a defined sequence during a yaw operation when the desired orientation is reached. Thus, a stop command is provided to the motors once a desired orientation is reached and a command is sent to activate a yaw brake system, e.g. a hydraulic brake. Furthermore, it is known to send a command to the motor brakes of the yaw motors after some time to also block the motors.

It has surprisingly been found that in some situations, particularly in case of high winds and/or wind gusts, the aforementioned operation can lead to misalignment, and premature wear and tear of the yaw system.

The present disclosure seeks to provide improved methods of operating a wind turbine and wind turbines that at least partially reduce one or more of the aforementioned problems.

SUMMARY

In an aspect of the present disclosure, a method for operating a wind turbine during a yaw operation is provided. The method includes operating one or more yaw drives to rotate the nacelle with respect to the tower. The method also includes predicting an end of the yaw operation and, in response to predicting the end of the yaw operation, actuating a hydraulic brake before the predicted end.

According to this aspect, the yaw operation sequence is such that actuation of the hydraulic brake is carried out in response to predicting an end of a yaw operation and not at or after said end. That is, the operating state of the hydraulic brake is changed in response to predicting an end of the yaw operations. The actuation is done in anticipation of the predicted end so that a suitable braking moment, is applied by the time the end of the yaw operation is reached. The braking moment mitigates potential slipping of the nacelle when yawing operation is stopped, which can result in uncontrolled movement of the nacelle. With this operation, the risk of damage, failure or premature wear of wind turbine components is mitigated.

In a further aspect of the disclosure, another example of a method for operating a wind turbine during a yaw operation is provided. The method includes operating one or more yaw drives to rotate the nacelle with respect to the tower. The method includes predicting an end of the yaw operation and actuating a hydraulic brake before the predicted end so that the braking moment exerted by the hydraulic brake at the predicted end of the yaw operation is at least 60%, specifically at least 70% and more specifically at least 80% of its rated value.

In a further aspect of the disclosure, a control system for a wind turbine is provided. The control system is configured to perform methods according to any example of the aforementioned aspects. The control system is configured to instruct one or more yaw drives to rotate the nacelle of a wind turbine with respect to the tower during a yaw operation and to predict an end of the yaw operation. The control system is further configured to control, in response to predicting an end of the yaw operation, the actuation of a hydraulic brake before the predicted end.

Still in a further aspect of the disclosure, a wind turbine is provided. The wind turbine comprises a tower, a nacelle rotatably mounted on the tower, and a yaw system for rotating the nacelle with respect to the tower around a longitudinal axis of the tower. The wind turbine furthermore comprises a control system according to previous example of the disclosure.

DETAILED DESCRIPTION OF EXAMPLES

Reference now will be made in detail to embodiments, one or more examples of which are illustrated in the drawings. Each example is provided by way of explanation only, not as a limitation. In fact, it will be apparent to those skilled in the art that various modifications and variations can be made in the present disclosure. For instance, features illustrated or described as part of one example can be used with another example to yield a still further example. Thus, it is intended that the present disclosure covers such modifications and variations as come within the scope of the appended claims and their equivalents.

Figure 1:
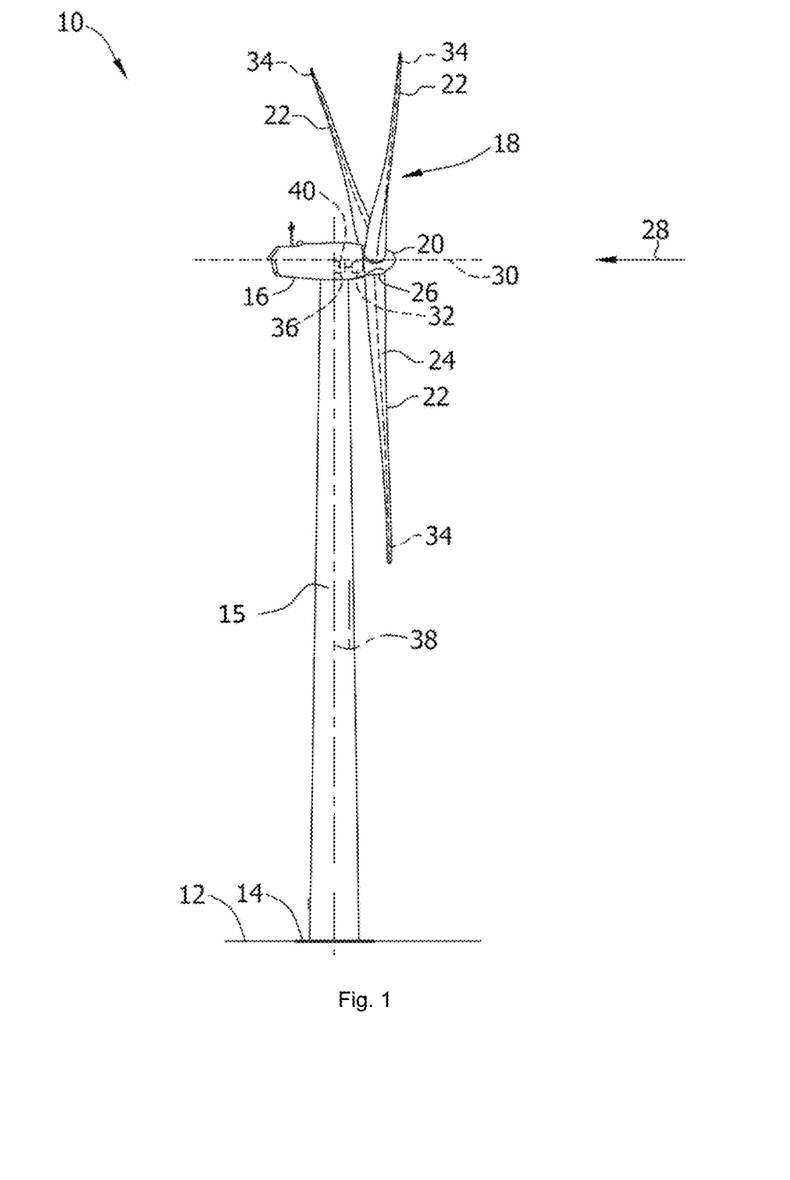
FIG. 1 illustrates a perspective view of one example of a wind turbine.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine 10 includes a tower 15 that extends from a support system 14 on a ground 12, a nacelle 16 mounted on tower 15, and a rotor 18 that is coupled to nacelle 16. The rotor 18 includes a rotatable hub 20 and at least one rotor blade 22 coupled to and extending outward from the hub 20.

In the example, the rotor 18 has three rotor blades 22. In an alternative embodiment, the rotor 18 includes more or less than three rotor blades 22. The tower 15 may be fabricated from tubular steel to define a cavity (not shown in FIG. 1) between a support system 14 and the nacelle 16. In an alternative embodiment, the tower 15 is any suitable type of a tower having any suitable height. According to an alternative, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root region 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines an orientation of the rotor blades 22 with respect to the wind direction, may be changed by a pitch system 32 to control the load and power output by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a nacelle 16 may be rotated about the longitudinal axis of the tower, i.e. about a yaw axis 38 to position the rotor blades 22 with respect to wind direction 28.

In the example, the wind turbine controller 36 is shown as being centralized within the nacelle 16, however, the wind turbine controller 36 may be a distributed system throughout the wind turbine 10, on the support system 14, within a wind farm, and/or at a remote-control center. The wind turbine controller 36 may include a processor 40 configured to perform some of the methods and/or steps described herein. Further, many of the other components described herein include a processor.

As used herein, the term "processor" is not limited to integrated circuits referred to in the art as a computer, but broadly refers to a controller, a microcontroller, a microcomputer, a programmable logic controller (PLC), an application specific, integrated circuit, and other programmable circuits, and these terms are used interchangeably herein. It should be understood that a processor and/or a control system can also include memory, input channels, and/or output channels.

A control system 36 may also include a memory, e.g. one or more memory devices. A memory may comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s) 40, configure the controller 36 to perform, or trigger the performance of, various steps disclosed herein. A memory may also be configured to store data, e.g. from measurements and/or calculations.

Figure 2:
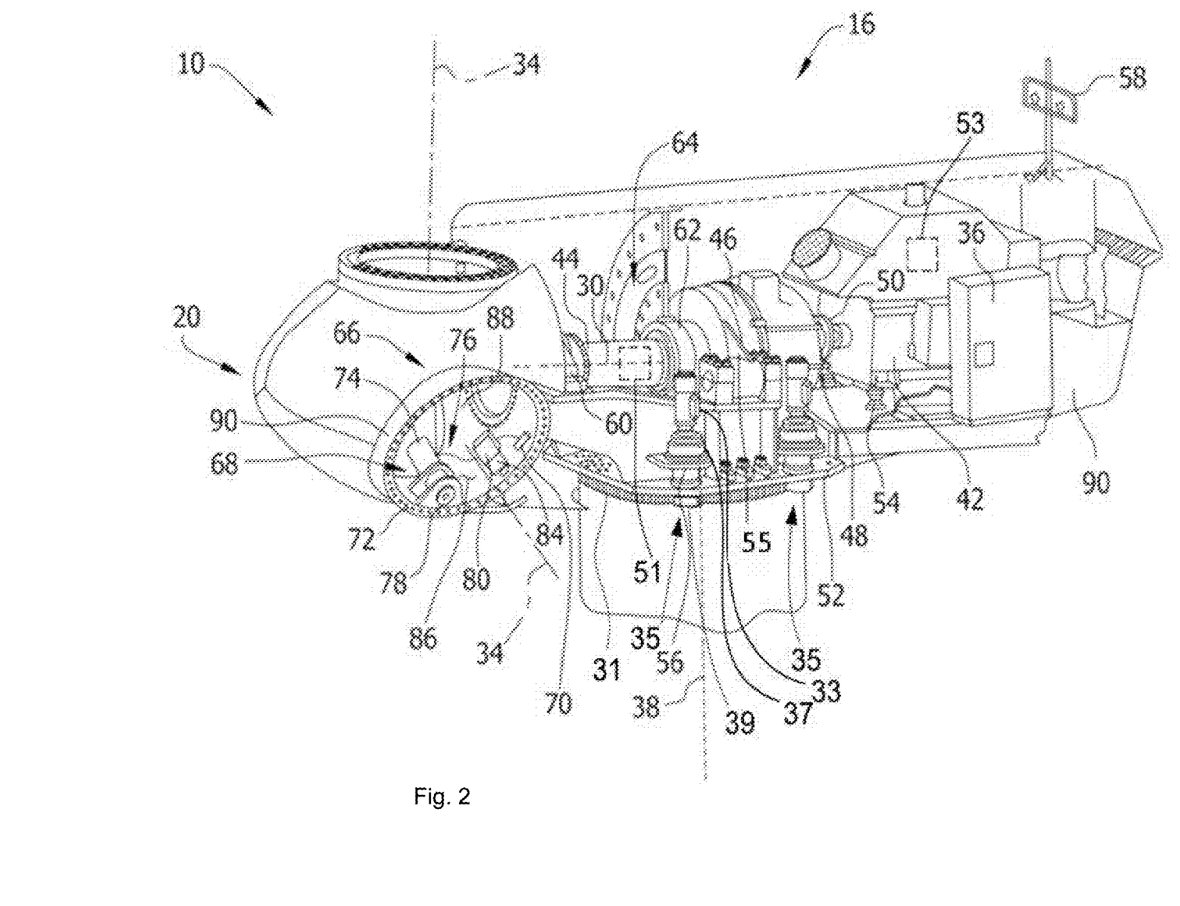
FIG. 2 illustrates a simplified, internal view of one example of the nacelle of the wind turbine of the FIG. 1.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high-speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high-speed shaft 48 by translating the relatively slow rotational movement of the rotor 18 and of the main shaft 44 into a relatively fast rotational movement of the high-speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage between 400V to 1000 V into electrical energy having medium voltage (e.g. 10-35 KV). Said electrical energy is conducted via power cables from the nacelle 16 into the tower 15.

The gearbox 46, generator 42 and transformer 90 may be supported by a main support structure frame of the nacelle 16, optionally embodied as a main frame 52. The gearbox 46 may include a gearbox housing that is connected to the main frame 52 by one or more torque arms 55. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 15 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

In some examples, the wind turbine may be a direct drive wind turbine without gearbox 46. Generator 42 operate at the same rotational speed as the rotor 18 in direct drive wind turbines. They therefore generally have a much larger diameter than generators used in wind turbines having a gearbox 46 for providing a similar amount of power than a wind turbine with a gearbox.

The nacelle 16 also may include a yaw system which comprises a yaw bearing (not visible in FIG. 2) having two bearing components configured to rotate with respect to the other. The tower 15 is coupled to one of the bearing components and the bedplate or support frame 52 of the nacelle 16 is coupled to the other bearing component.

The yaw system may comprise an annular gear 21 and a yaw drive mechanism 56 that may be used to rotate the nacelle 16 and thereby also the rotor 18 about the longitudinal axis of the tower, i.e. about a yaw axis 38 to control the perspective of the rotor blades 22 with respect to the wind direction 28.

The yaw drive mechanism 56 may comprise a plurality of yaw drives 35 with a motor 33, a gearbox 37 and a pinion 39 for meshing with the annular gear 21 for rotating one of the bearing components with respect to the other. The annular gear 21 may comprise a plurality of teeth which engage with the teeth of the pinion 39. In the example of FIG. 2, the yaw drives 35 and the annular gear 21 are placed outside the external diameter of the tower. The teeth of the annular gear are outwardly orientated, but in other examples, the annular gear and yaw drives may be arranged at the inside of the tower.

In some examples, one of the yaw drives may be a "master", and the other drives may be "slaves" following the instructions of the master or adapting their operation to adapt to the master drive.

The turbine controller 36 may be communicatively coupled to the yaw drive mechanism 56 of the wind turbine 10 for controlling and/or altering the yaw direction of the nacelle 16 relative to the wind direction 28. As the direction of the wind 28 changes, the wind turbine controller 36 may be configured to control a yaw angle of the nacelle 16 about the longitudinal axis of the tower or yaw axis 38 to position the rotor blades 22, and therefore the rotor 18, with respect to the direction 28 of the wind, thereby controlling the loads acting on the wind turbine 10. For example, the turbine controller 36 may be configured to transmit control signals or commands to the yaw drive mechanism 56 of the wind turbine 10, via a yaw controller or direct transmission, such that the nacelle 16 may be rotated about the longitudinal axis of the tower or yaw axis 38 via a yaw bearing.

For positioning the nacelle 16 appropriately with respect to the wind direction 28, the nacelle 16 may also include at least one meteorological measurement system which may include a wind vane and anemometer. The meteorological measurement system 58 can provide information to the wind turbine controller 36 that may include wind direction 28 and/or wind speed.

In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angel of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems 80 for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an embodiment, a power generator 84, for example comprising a battery and electric capacitors, is arranged at or within the hub 20 and is coupled to the sensor 70, the pitch control system 80, and to the pitch drive system 68 to provide a source of power to these components. In the example, the power generator 84 provides a continuing source of power to the pitch assembly 66 during operation of the wind turbine 10. In an alternative embodiment, power generator 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the example, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer surface of hub 20 and may be coupled, directly or indirectly, to the outer surface.

Figure 3:
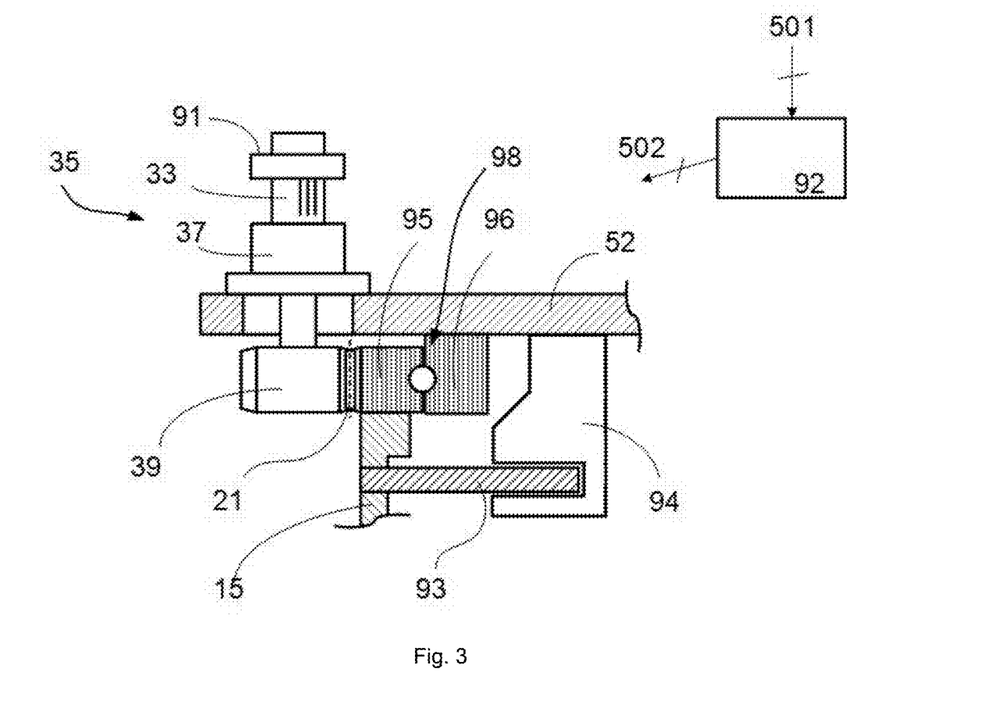
FIG. 3 schematically illustrates one example of a yaw system.

FIG. 3 illustrates a portion of yaw system according to one example. The yaw system comprises a yaw bearing 98 having a first bearing component 95 coupled to the tower 15 and a second bearing component 96 coupled to the main frame 52 of the nacelle. The yaw system comprises an annular gear 21 which, in this example, is coupled to the first bearing component 95. Other configurations are also possible such as, e.g. the annular gear 21 may be coupled to the tower 15. The yaw system comprises a yaw drive 35 and the yaw drive 35 in this example comprises a motor 33, a gearbox 37 and a pinion 39 for meshing with the annular gear 21. The rotation of the motor may rotate the pinion with respect to the annular gear 21. As mentioned, in this example the annular gear 21 is coupled to the first bearing component 95, so the first bearing component 95 may rotate with respect to the second bearing component 96 which is coupled to the main frame 52. Although only a single yaw drive is shown, it should be clear that multiple yaw drives, each with their motor, gearbox and pinion may be provided around the circumference of the tower.

The annular gear 21 may comprise a plurality of teeth which engage with the teeth of the pinion 39. In this example, the yaw drive 35 and the annular gear 21 are placed outside the external diameter of the tower. The teeth of the annular gear 21 are outwardly oriented. However, in other examples, the annular gear 21 and the yaw drive 35 may be placed inside the tower.

The yaw system of FIG. 3 further comprises a braking disk 93 and a hydraulic brake unit 94 configured to exert a braking force on the braking disk 93 for braking the rotation of the first bearing component 95 with respect to the second bearing component 96. Although only a single hydraulic brake unit is shown, a plurality of brake units may be provided along the circumference of the tower.

In FIG. 3, the braking disk 93 is connected to the tower 15. In other examples, the braking disk 93 may be integrally formed with the tower 15. The hydraulic brake unit 94 may comprise a brake caliper attached to the support frame 52 and may engage the brake disk 93 to prevent rotation of the nacelle 16 with respect to the tower 15. In order to activate the brake unit 94, i.e. to engage with the brake disk 93, the hydraulic brake unit 94 may comprise an active hydraulic system to control the pressure of the brake caliper on the braking disk 93.

In some examples, the actuation of the brake unit 94 may be controlled by a controller 92. In some examples, the controller 92 may be embodied in the wind turbine controller. The controller 92 may activate or deactivate the brake unit 94 or it may actuate the brake unit 94 to control the pressure of the hydraulic system so as to control the braking moment exerted by the brake unit 94 when engaging with the brake disk 93. In particular, a moderate braking moment (e.g. in the range of 20-40% depending on the design and mode of operation) may be exerted during the rotation of the nacelle to provide some damping 16 and an actuation may be needed to increase the braking moment exerted by the brake unit 94 to stop the yaw operation.

In some examples, the motor 33 may comprise a motor brake 91. The motor brake 91 may be arranged inside the housing of the motor 33 and it may be arranged to block rotation of the motor 33. The motor brake 91 may comprise a friction brake where a friction disk is secured to the rotatable shaft of the electric motor 33. The friction disk may be configured to engage a non-rotating surface, thus exerting a braking moment on the system.

A control system 92 configured to control the yaw system according to a certain algorithm is also illustrated in FIG. 3. In this example, a stand-alone control system 92 is depicted. Nevertheless, it is understood that the control of the yaw system may be implemented in any controller, including, e.g. the wind turbine controller 36.

The yaw system of FIG. 3 comprises a bearing 98 of the roller bearing type. Nevertheless, other types of bearings such as gliding yaw bearings are well-known in the art and may be also used in further examples.

The motor illustrated in FIG. 3 may be directly connected to the power supply or it may be connected to the power supply via a vertical frequency drive, VFD (not shown in the figure). The use of such VFDs is well-known in the art so no further details are herein provided.

Figure 10:
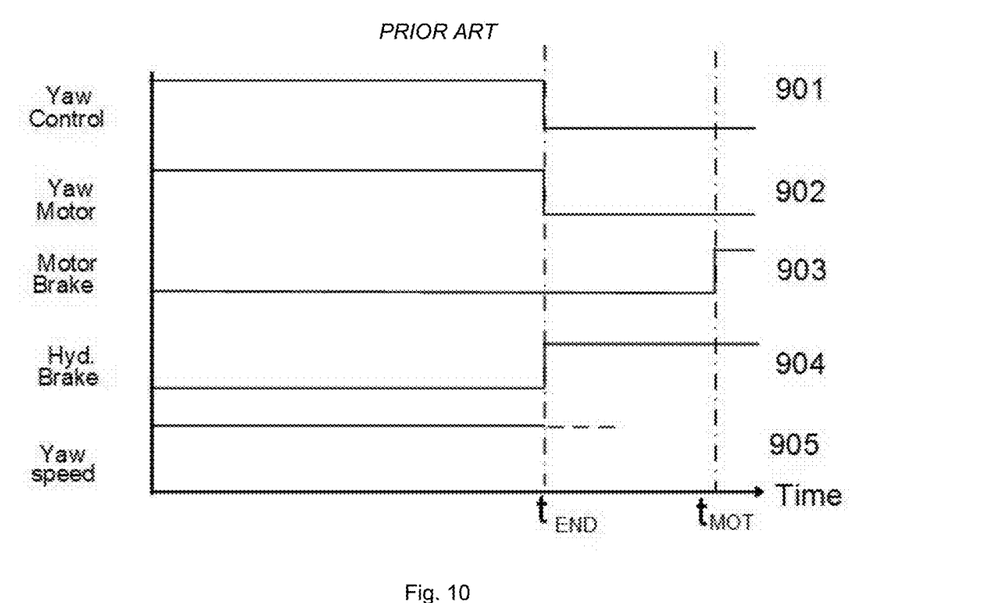
FIG. 10 schematically illustrates the operation of the yaw system during a yaw operation according to the prior art.

FIG. 10 depicts the time evolution of the yaw operation according to a method of the prior-art. In particular, the behavior of the system at an end of the yaw operation is depicted. Line 901 shows the Yaw Control command, which transitions from a high level to a low level at $t_{END}$ to indicate an end condition for the yaw operation. Line 902 shows the status of the yaw motor 33 which is stopped at the end of the yaw operation so that no more driving moment is applied to rotate the nacelle with respect to the tower. The hydraulic brake 94, whose evolution is represented by line 904, is actuated at $t_{END}$ to help stop the rotation by applying a corresponding braking moment. Finally, the motor brake 91 is also activated after the end of the yaw operation after some inevitable delay. The actuation of the hydraulic brake 94 represented in line 904 may not necessarily involve an "activation" (i.e. turning the brake "on") of the hydraulic brake 94. In some applications, the hydraulic brake 94 may already exert a moderate braking moment during the yaw operation so that the transition in line 904 would represent a change of the operating state (but not necessarily an activation) of the hydraulic brake 94 to increase its braking moment.

As mentioned in the introduction, it has been found that this prior-art method can lead to misalignment and premature wear of the yaw system. It has been observed that the misalignment results in an increased number of yaw operations for the wind turbine and, in some cases, it requires shut down of the wind turbine, which increases economic revenue and further increases the wear of the components.

After careful analysis, the inventors identified a problem at the end of the yaw operation. Yaw motors 33 are deactivated at $t_{END}$ so control of the nacelle 16 by the motors 33 is no longer possible. On the other hand, even if the hydraulic brakes 94 are activated at $t_{END}$, it has been found that a period exists during which the braking capacity of the hydraulic brakes 94 is insufficient to control the movement of the nacelle 16. During that timeframe, the nacelle 16 is still subject to certain loads, such as wind loads, and it may slip, especially in case of high wind loads due to. e.g. high prevailing wind speeds or the occurrence of a wind gust. Inventors have found that such slipping may lead to uncontrolled nacelle acceleration.

As a result of this movement of the nacelle 16, the yaw speed (line 905) may suffer uncontrolled deviations as represented by the dashed line 905 after $t_{END}$. It has been found that these nacelle accelerations may result in further movement of the nacelle after $t_{END}$ leading to significant yaw misalignment or to significant wear or damage of wind turbine components such as components of the yaw system itself or even other components of the wind turbine in case of very high slip resulting in mechanical loads exceeding design loads. As an example, the motor brake 91 may be actuated at $t_{MOT}$ but, depending on prevailing conditions, the yaw speed at $t_{MOT}$ may be excessive, which may induce premature wear of the motor brake 91.

Based on these observations, the inventors have developed new control methods for yaw operation as explained below.

Figure 4:
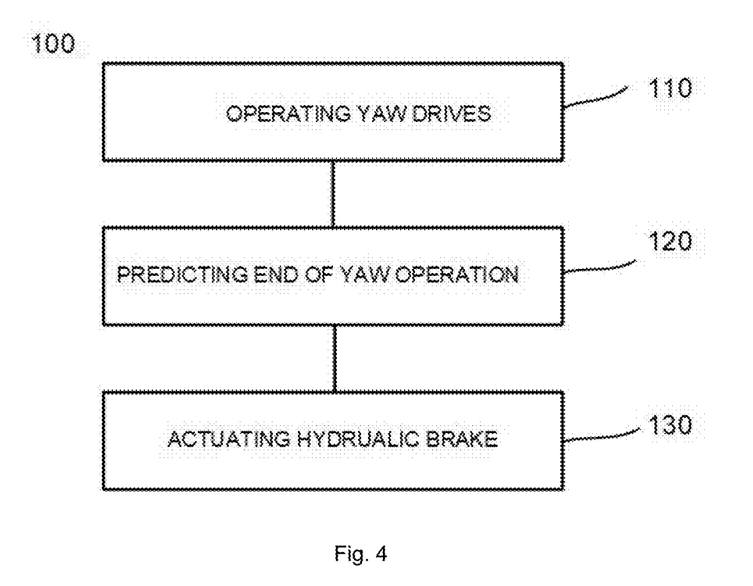
FIG. 4 shows a flow chart of an example of a method for controlling a wind turbine during a yaw operation.

In an example of the disclosure, a method 100 for controlling a wind turbine 10 during a yaw operation is provided. The method 100 is schematically illustrated in the flow chart of FIG. 4. The method comprises, at block 110, operating the yaw drives 35 to rotate the nacelle 16 with respect to the tower 15. The method further comprises, at block 120, predicting an end of the yaw operation. Block 130 of the method comprises, in response to predicting the end of the yaw operation in block 120, actuating the hydraulic brake 94 before the predicted end.

It should be noted that, actuating the hydraulic brake may either result in the activation of the hydraulic brake or in a modification on the operating conditions of the hydraulic brake. As mentioned before, it is known from examples of the prior art, that a certain braking moment can be applied by a hydraulic brake during the yawing operation to provide some damping. Thus, it is known to operate the hydraulic brakes at 20-40% of its rated moment while yawing during power production, so that damping is achieved in some existing designs. In such cases, the actuation of the hydraulic brake according to the present disclosure, which is carried out in response to predicting an end of the yaw operation itself, would result in a change, and more specifically in an increase, of the braking moment above the braking moment exerted during the yaw rotation.

In some other modes of operation, i.e. when yawing for cable untwisting, lower values (or even 0%) may be used during the yawing. In those cases, actuation according to this aspect may result in the activation of the hydraulic brake.

Specific values depend on certain design details of the yaw system in the wind turbine. For example, yaw systems comprising gliding bearings may achieve an adequate level of damping during power production mode with less pressure (or even with no pressure) on the hydraulic brakes than yaw systems comprising ball bearings.

This example of the disclosure will now be explained with reference to FIG. 5, which illustrates the time evolution of the yaw operation according to the method 100 as well as the evolution of the nacelle rotation speed during the yaw operation. Line 101 shows the Yaw Control command that is used to initiate the yaw operation (by switching from low to high in the figure) or to indicate that an end condition for the yaw operation has been reached, in which case the Yaw Control signal is switched from high to low. This command is provided by a controller 92 that controls yaw operation of the wind turbine and which can be either a stand-alone controller or a controller implemented in the wind turbine controller 36.

Line 102 shows the status of the yaw motor 33. The yaw motor 33 is activated when the Yaw Control signal is switched from low to high so that a driving moment is applied by the yaw drive 35 to actively rotate the nacelle 16 with respect to the tower 15 and initiate the yaw operation. Line 103 shows the behavior of the motor brake 91 which is also deactivated when the yaw system receives the indication to initiate the yaw operation to allow the yaw operation to take place. Also illustrated in this example is the evolution 104 of the hydraulic brake 94, the pressure of which is reduced when starting the yaw operation so that the braking moment exerted by the hydraulic brake 94 is reduced. Finally, 105 schematically represents the yaw speed, i.e. the rotational speed of the nacelle 16 as it rotates around the longitudinal axis of the tower 15. As expected, activation of the Yaw Control signal 101 results in an increase of the yaw speed 104 for a brief period until a stabilized speed is reached for the yaw operation.

According to this example of the disclosure, an end of the yaw operation is predicted during the yaw operation. A high frequency can be used for the prediction, which in specific examples comprises a cycle time for the prediction between 20-100 ms and, more specifically, of 40 ms during the yaw operation.

Figure 5:
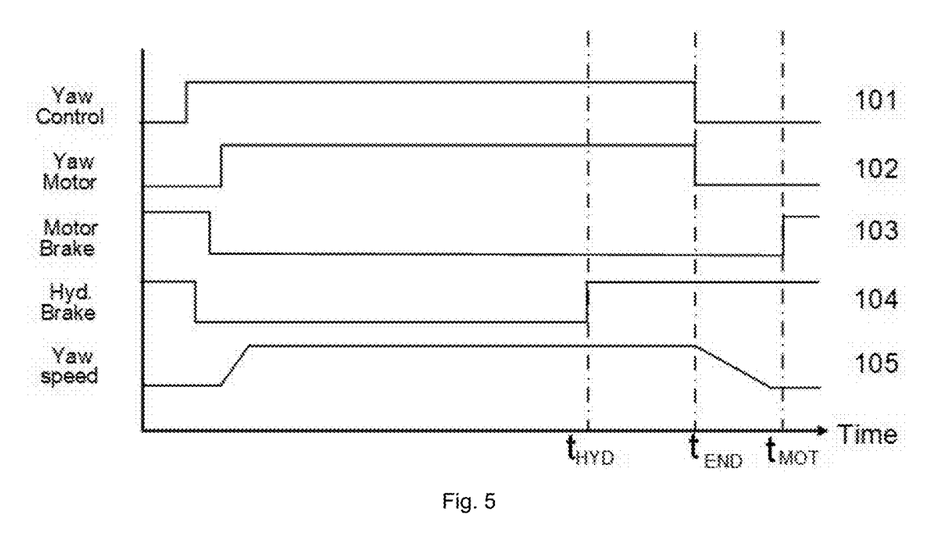
FIG. 5 schematically illustrates the operation of the yaw system during a yaw operation according to an example.

In the example shown in FIG. 5, the end of the yaw operation occurs at a time $t_{END}$. According to this example of the method and, more particularly, according to block 130 of the method 100, the hydraulic brake 94 is actuated at an earlier time, $t_{HYD}$, as seen in curve 104 so that the braking moment is increased at an early stage and it reaches a significant braking moment by the time $t_{END}$. The actuation of the hydraulic brake 94 occurring at $T_{HYD}$ is made in response to the prediction of the end of the yaw operation. According to this example, the braking moment resulting from the early activation of the hydraulic brake 94 reduces the potential slip of the nacelle 16 occurring during the finalization of the yaw operation.

In an example of a method for operating a wind turbine, predicting an end of the yaw operation comprises predicting a time for finalization of the yaw operation and/or predicting an orientation of the nacelle 16 with respect to the tower 15 for finalization of the yaw operation. In particular, as further detailed below in relation to some specific examples, different methods may be used for predicting the end of the yaw operation which may depend on, e.g. the reason for the yaw operation. In some circumstances, the end of the yaw operation may be better defined by a specific time (or time left with respect to the current time) by which the yaw operation is expected to end or by the specific orientation that the nacelle 16 is expected to exhibit at the end of the yaw operation.

In an example of a method, the hydraulic brake 94 is characterized by a rated braking moment. The method comprises actuating the hydraulic brake 94 in a manner and at a time, $t_{HYD}$, such that the braking moment exerted at $t_{END}$ is at least 60%, specifically 70% or more specifically at least 80% of the rated value. With increasing values of the braking moment, the potential slipping of the nacelle is further reduced and, consequently, the potential risk of damage or failure of wind turbine components is further mitigated.

In another example of a method for operating a wind turbine during a yaw operation, the evolution of the pressure of the hydraulic brake 94 is considered. Thus, a hydraulic brake 94 may be defined by the time needed for its pressure to reach a predetermined value, starting from an operational situation i.e. the hydraulic brake pressure rise time. In particular, the predetermined value may refer to a percentage of the hydraulic pressure rated value such as, e.g. 80%, 90% or 100% of the rated value. Thus, in this example, actuating the hydraulic brake 94 at $t_{HYD}$ before the predicted end time, i.e. before $t_{END}$, may comprise actuating the hydraulic brake 94 based on the hydraulic brake pressure rise time. In a more particular example, actuating the hydraulic brake 94 based on the hydraulic brake pressure rise time comprises actuating the brake 94 when the time left until the predicted end is substantially equal to the hydraulic brake pressure rise time. In other words, upon predicting the time $t_{END}$, $t_{HYD}$ is selected so that $t_{END}$-$t_{HYD}$ is substantially equal to the hydraulic brake pressure rise time. With this example, the braking moment applied at $t_{END}$ by the hydraulic brake 94 is close to the value expected for the predetermined value of the hydraulic pressure, which may be, for instance, 80%, 90 or 100% of its rated value. This would result in a high braking moment being applied so that nacelle 16 slipping and associated risks are highly mitigated.

The hydraulic brake pressure rise time may be determined as the time needed for the pressure to reach a predetermined value (e.g. a percentage of the rated value) when starting from a value of the pressure corresponding to the operation of the hydraulic brake 94 during yaw operation. In some examples, the hydraulic brake 94 may be deactivated during rotation. But in some other cases, the hydraulic brake 94 may be exerting a moderate braking moment, e.g. 40% of its rated value, for damping purposes. In the former case, the hydraulic pressure rise time would correspond to the time needed to increase the pressure from 0% of the predetermined value (e.g. a percentage of the rated value) whereas in the latter case, the hydraulic pressure rise time would correspond to the time needed to increase the pressure from 40% of the rated value to the predetermined value.

In an example of a method for operating a wind turbine, predicting an end of the yaw operation comprises predicting the time when the nacelle 16 will reach a predetermined orientation with respect to the tower 15. This may be the case for some yaw operations involving deterministic yaw movements such as, e.g. a movement related to a cable untwisting operation in which the final orientation of the nacelle 16 with respect to the tower 15 is predetermined based on the arrangement of the cables with respect to the tower 15. In such cases, the orientation of the nacelle 16 at the end of the yaw operation may be known but the time needed to reach that position may need to be predicted as this may be dependent on different design and/or prevailing operating conditions.

In yet a further example, predicting an end of the yaw operation comprises predicting the time and/or the nacelle 16 orientation with respect to the tower 15 at which an error between the orientation of the nacelle 16 and a prevailing wind direction 28 is equal to or below a threshold value. This may be the case in certain modes of operation, such as power production mode, involving non-deterministic movements of the nacelle 16. Indeed, it is known that, especially during power production mode, the objective is for the rotor 18 of the wind turbine 10 to be aligned with the prevailing wind direction. Nevertheless, wind direction 28 is constantly changing so a varying yaw error is defined in real time as the difference between the wind direction 28 and the actual orientation of the nacelle 16.

The wind direction 28 can be measured with a wind vane, estimated from load measurements, or obtained in other manners known in the art. As the wind direction 28 can change rapidly, average values, e.g. obtained over ten-minute periods, may be used. In order to ensure optimum energy capture from the wind and proper loads control, a yaw error threshold may be defined which may not be exceeded. Particularly, a yaw error threshold may be defined for activation of the yaw system. In case the determined yaw error exceeds said threshold, activation of the yaw system may be carried out in order to reduce the misalignment. Similarly, a yaw error threshold may be used to indicate the end of a yaw operation after orientation of the nacelle 16 reduces the misalignment of the nacelle 16 with respect to the wind direction 28 to a sufficiently low value. In some examples, hysteresis may be provided so that the value of the yaw error threshold for activation of the yaw system is larger than the value of the yaw error threshold for indication of an end condition.

In some examples, the actual wind direction 28, the actual orientation of the nacelle 16 with respect to the tower 15 and the speed of rotation of the nacelle 16 may be used to predict the end time or the nacelle orientation relative to the tower 15 at the end of the yaw operation. In particular, the actual wind direction 28 and the actual orientation of the nacelle 16 may be used to derive the actual yaw error. The evolution over time of the yaw error may then be used to predict the time and/or the corresponding orientation of the nacelle 16 by the time the yaw error satisfies the threshold condition to end the yaw operation.

In another example of a method to operate a wind turbine during a yaw operation, the yaw drive 35 comprises at least one motor 33 which is turned off at $t_{END}$, i.e. when the end of the operation is reached. By stopping the motors 33, no more driving moment is applied to the nacelle 16 so that the movement of the nacelle 16 is determined by the braking moment applied by the braking system and by the loads acting on the wind turbine 10. In some examples, the at least one motor 33 may be turned off after a certain delay after $t_{END}$. This delay may be useful to provide some additional time for the hydraulic brake 94 to build its pressure and braking moment. Nevertheless, the delay may be kept short to prevent any noticeable yaw offset with respect to the initially intended orientation.

In yet further examples, the yaw drive 35 comprises one or more yaw motors 33 that comprise a motor brake 91. In those examples, the motor brake 91 may be activated after the end time of the yaw operation, $t_{END}$, and after stopping the yaw motors 33. Such behavior is also presented in FIG. 5 which depicts the activation of the motor brake at $t_{MOT}$. Activation of the motor brake 91 may be triggered differently according to different examples. Motor brakes may comprise some friction elements which may wear prematurely if activation of the motor brake 91 occurs while rotational speed is high. For that reason, it may be preferred to activate the motor brake 91 once the rotational speed has decreased significantly. In that sense, an example of the invention may comprise activating the motor brake 91 after a predetermined delay after the end of the yaw operation. In that case, $t_{MOT}$ and $t_{END}$ may be separated by some predetermined time delay which may selected under the estimation that, at least under some conditions, the rotational speed by the time $t_{MOT}$ is sufficiently low or even null.

Figure 6:
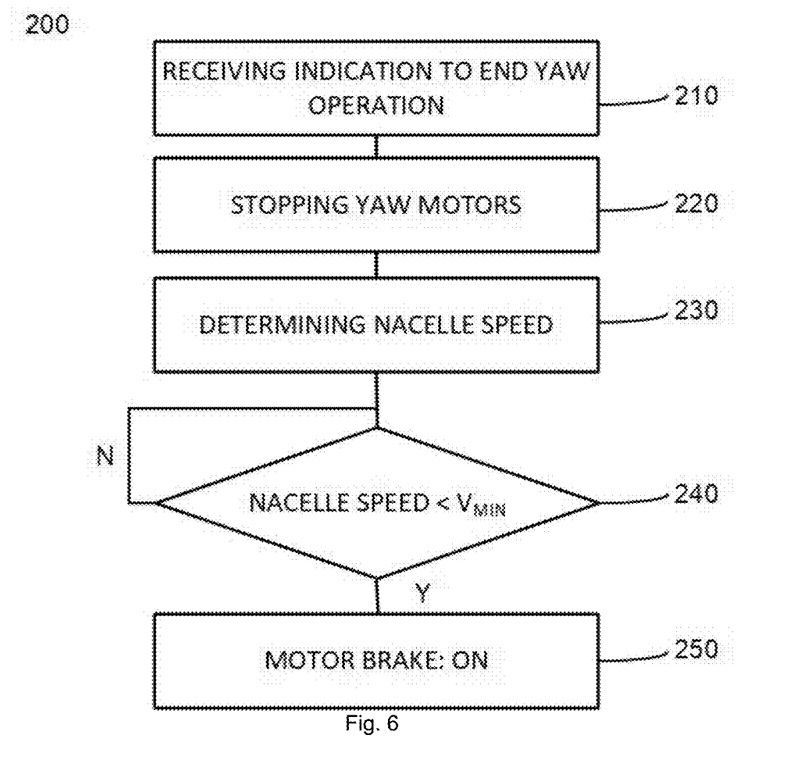
FIG. 6 shows a flow chart of another example of a method for controlling a yaw motor brake during a yaw operation of the wind turbine.

FIG. 6 shows a flow chart of an example of another method 200 for controlling a wind turbine 10 during a yaw operation and, more particularly, for controlling a yaw motor 33 and a motor brake 91 during an end of a yaw operation. In this method, the activation of the yaw motor brake 91 is not based on a certain predetermined time but on the nacelle 16 speed. The method comprises, at block 210, receiving an indication of an end of the yaw rotation operation. This indication may be generated by a controller 92 and this may be based on different criteria depending on the mode of operation as explained above. Block 220 comprises stopping the yaw motors 33 so that no more driving moment is provided in an active manner. Block 230 comprises determining the nacelle speed whereas block 240 comprises checking if the nacelle speed reaches a predetermined minimum speed threshold ($v_{MIN}$). The method remains at block 240 while the nacelle 16 speed is above $v_{MIN}$. Block 250 corresponds to the situation when the nacelle 16 speed reaches the minimum speed threshold, in which case the motor brake 91 is activated.

Figure 7:
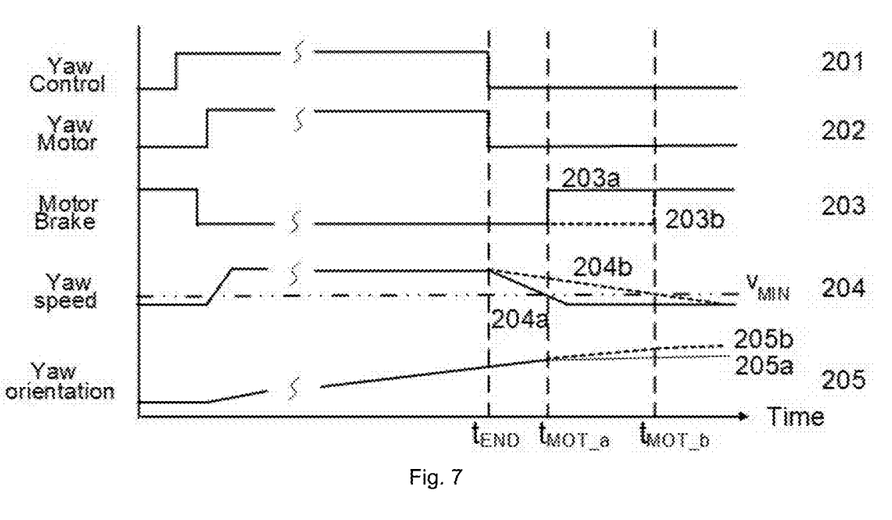
FIG. 7 schematically illustrates the operation of the yaw system during a yaw operation according to another example.

In order to further illustrate this method, FIG. 7 schematically shows the evolution of the Yaw Control command 201, the yaw motor status 202, the yaw motor brake status 203, the yaw speed of the nacelle 204 during the operation and the variation of the yaw orientation 205 of the nacelle 16 with respect to the tower 15 during the operation. As already explained in regard to FIG. 5, the yaw speed 204 is increased upon activation of the yaw operation until a stable yaw speed is reached. The yaw operation ends at $t_{END}$ as indicated by the Yaw Control command 201 switching from high to low.

According to this example, the yaw motor 33 is stopped as also indicated by the corresponding transition from high to low in curve 202. The nacelle speed is then determined. Two different scenarios, resulting in different evolutions of the nacelle speed, are presented in FIG. 7. Thus, both curves 204a and 204b exhibit the expected behavior during the braking process, i.e. the nacelle 16 speed is reduced, but at different rates.

As previously mentioned, it is preferable to activate the motor brake 91 at a low speed to prevent premature wear of friction parts. For that reason, a minimum speed threshold, $v_{MIN}$, is predetermined which the aim to maintain the wear of the motor brake within acceptable design parameters. In this particular example, curve 204a presents a situation where the nacelle speed decreases rapidly after $t_{END}$. Consequently, the activation time for the motor brake 91 in this situation ($t_{MOT\_a}$) is very close to the end time for the yaw operation, $t_{END}$.

On the other hand, curve 204b presents a scenario where the slowing down of the nacelle takes more time so that the nacelle speed remains above the minimum threshold for a longer time. In this second case, the motor brake 91 is not activated until $t_{MOT\_b}$. Note that this has an effect also on the final orientation of the nacelle. Thus, curves 205a and 205b show the evolution of the yaw position after the end of the yaw operation. It can be observed how the yaw deviation is lower (205a) in the case where the nacelle speed reaches the minimum threshold in a short period of time whereas a larger deviation (205b) on the yaw position can be observed in the scenario where the nacelle 16 speed remains above the minimum threshold for activation of the motor brake 91 for a longer time. The change from one scenario to the other may be dependent on different factors, including but not limited to, the prevailing wind conditions during the stop sequence or the braking moment exerted by other braking mechanisms that may be present in the wind turbine 10.

Figure 8:
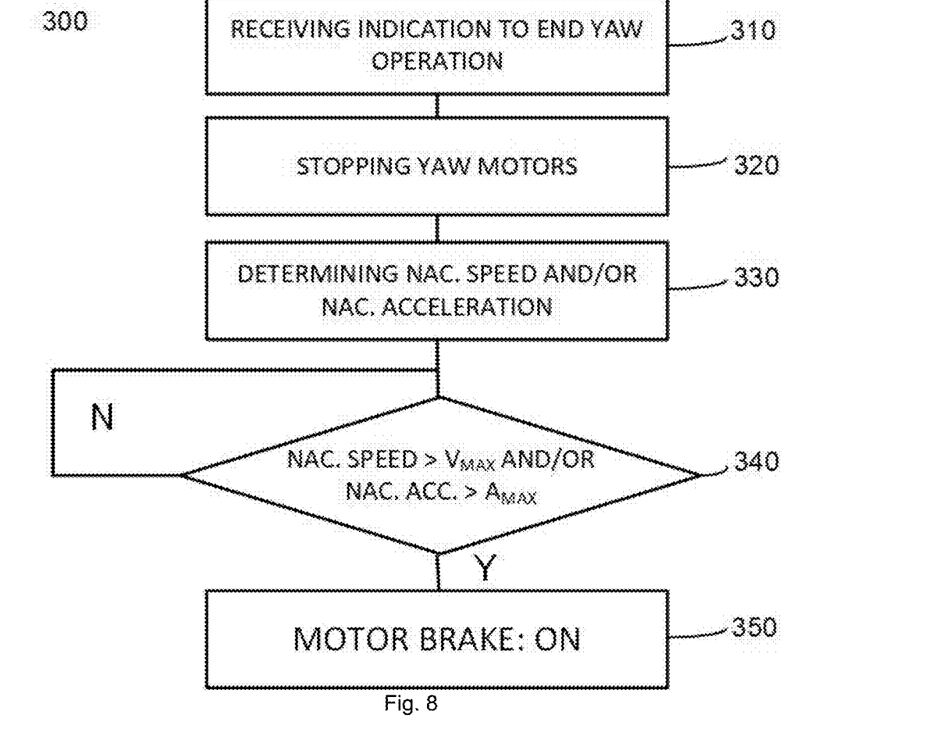
FIG. 8 shows a flow chart of a further example of a method for controlling a yaw motor brake during a yaw operation of the wind turbine.

FIG. 8 shows a flow chart of still a further example of a method 300 for controlling a wind turbine 10 during a yaw operation and, more particularly, for operating a yaw motor 33 and a motor brake 91 during an end of a yaw operation. A block 310 is included which comprises, similarly, to block 210 of method 200, receiving an indication of an end of the yaw rotation operation. Block 320 comprises stopping the yaw motors 33. Block 330 comprises determining the yaw speed of the nacelle and/or the yaw acceleration of the nacelle whereas block 340 comprises comparing those determined variables with some predetermined maximum thresholds. If the determined yaw speed or the determined yaw acceleration exceeds the respective predetermined threshold, the method continues to block 350, which comprises activating the motor brake 91 so that further movement of the nacelle 16 is limited.

Figure 9:
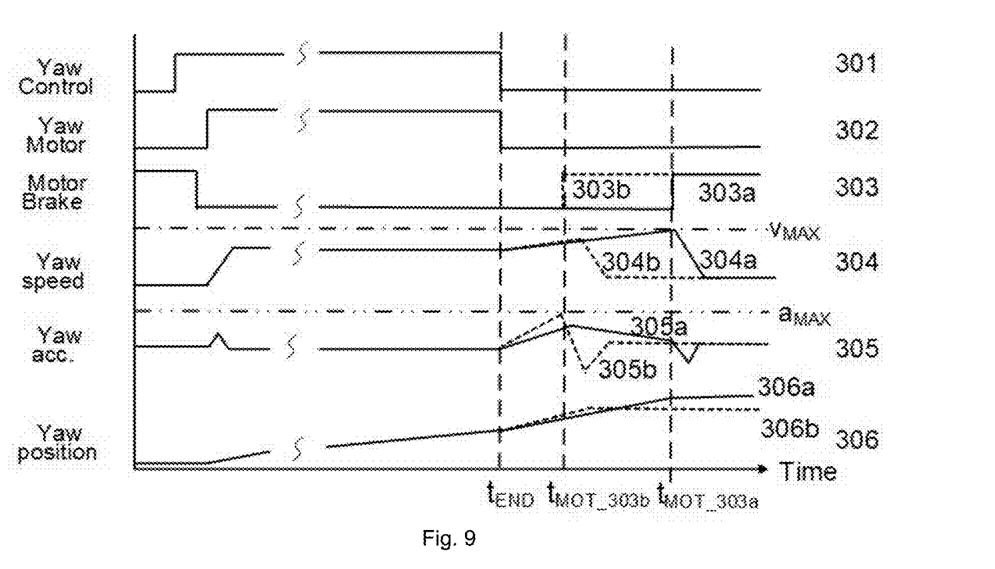
FIG. 9 schematically illustrates the operation of the yaw system during a yaw operation according to a further example.

In this further example of a method for operating a wind turbine, which is also schematically illustrated by the time evolution of the different elements in FIG. 9, a different behavior than in the previous example is considered. In particular, curves labelled with an "a" or a "b" in FIG. 9 depict different scenarios where the nacelle 16 is not slowing down at the end of the yaw operation as typically expected. On the contrary, the nacelle 16 in these examples experiences increased speed (304a) or acceleration (305b) after the end of the yaw operation and the stopping of the yaw motor 33. Thus, solid lines (corresponding to a first "a" scenario) show a situation where the nacelle speed 304a reaches a certain predetermined maximum threshold, $v_{MAX}$, whereas dashed lines (corresponding to a second "b" scenario) show a situation where a sudden increase of the acceleration is observed at the end of the yaw operation, which results in the nacelle acceleration (305b) reaching a predetermined maximum threshold, $a_{MAX}$.

Different physical situations may lead to such behavior, including but not limited to a very high wind gust occurring at that moment or the malfunctioning of other braking mechanisms such as, e.g. a hydraulic brake 94, in the wind turbine 10. In such situations, this further example shows activation of the motor brake 91 even if the rotational speed is high. As mentioned before, this is not a preferred mode of operation for the motor brake 91 as operation at high speeds may induce significant wear or damage on the friction system of the motor brake 91. Nevertheless, this example is dealing with certain scenarios where the motor brake 91 may be used as a safety system for the wind turbine 10.

FIG. 9 also depicts the evolution of the yaw position 306 in the two above mentioned scenarios. This schematically illustrates how the orientation of the nacelle 16 with respect to the tower 15 exhibits some runaway resulting from the extreme speed and/or acceleration. Nevertheless, the magnitude of the runaway is contained by the activation of the motor brake 91.

Even if FIG. 9 refers to an example of a method for operating a wind turbine 10 in which both the nacelle speed and the nacelle acceleration may be considered, further examples are also included which may comprise using only the speed or only the acceleration to detect operating conditions for which the motor brake 91 may be activated as a safety mechanism.

Nacelle speed and nacelle acceleration may refer to different directions of rotation of the nacelle 16 with respect to the tower 15. In particular, the direction of said rotation may be dependent on the loads acting on the wind turbine 10 after the predicted time to end the yaw operation, $t_{END}$. In variants of the above-mentioned methods 200 and 300, the respective thresholds for nacelle speed and nacelle acceleration for activation of the motor brake 91 may be dependent on the direction of the rotation of the nacelle 16 and, more particularly, on whether the rotation experienced after $t_{END}$ is in the same direction as the rotation during the yaw operation.

Note that the evolution of the different magnitudes presented in FIGS. 5, 7 and 9 and, more particularly, the evolution of the nacelle speed, nacelle acceleration and nacelle orientation are provided for illustrative purposes only to help understand the methods but they should not be understood as accurately representing the operation of the nacelle.

Details and explanations of methods 100, 200 and 300 may be combined with and applied to each other.

According to another aspect of the disclosure, a controller 92 is provided. The controller 92 is configured to perform the methods of operating a wind turbine during a yaw operation as described throughout this disclosure or any equivalent examples (including combinations). The controller 92 may be implemented as a stand-alone controller to control the yaw system or it may be implemented as part of the wind turbine controller 36.

The controller 92 may be configured to receive a plurality of signals 501, such as signals indicative of wind direction 28, nacelle 16 orientation with respect to the tower 15, nacelle speed, nacelle acceleration, etc. The controller 92 may use that information to obtain a plurality of signals 502 to control the yaw system including generating the Yaw Control command (101, 201, 301) and controlling the hydraulic brake 94, the yaw motors 33 or the motor brakes 91.

According to another aspect of the disclosure, a wind turbine 10 comprising a tower 15, a nacelle 16 rotatably mounted on top of the tower 15, a wind turbine rotor 18 including a plurality of wind turbine blades 22 and a yaw system is provided. The wind turbine comprises a controller 92 that is configured to perform the methods as described throughout this disclosure or any equivalent examples (including combinations). In some examples, the wind turbine 10 may comprise a yaw system with variable frequency drives (VFDs) to control the yaw motors 33. The use of such VFDs may provide additional control capabilities to the yaw operation.

This written description uses examples to disclose the teaching, and also to enable any person skilled in the art to practice the teaching, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various examples described, as well as other known equivalents for each such aspects, can be mixed and matched by one of ordinary skill in the art to construct additional examples and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A method for controlling a wind turbine during a yaw operation, the wind turbine including a nacelle, a tower, and a yaw system that rotates the nacelle relative to the tower about to a longitudinal axis of the tower, the yaw system including a hydraulic brake and one or more yaw drives, the method comprising:
   operating the one or more yaw drives at a first operational state in a yaw operation to rotate the nacelle with respect to the tower;
   predicting an end of the yaw operation when the one or more yaw drives are stopped;
   in response to the predicted end of the yaw operation, actuating the hydraulic brake before the predicted end of the yaw operation so that a predetermined braking moment of the hydraulic brake is achieved at or before the predicted end of the yaw operation; and
   maintaining the one or more yaw drives at the first operational state until the predicted end of the yaw operation.

2. The method according to claim 1, wherein the predicting an end of the yaw operation comprises predicting a time of completion of the yaw operation or a nacelle orientation with respect to the tower for completion of the yaw operation.

3. The method according to claim 1, wherein the hydraulic brake has a rated braking moment, and wherein the predetermined braking moment exerted by the hydraulic brake at the predicted end of the yaw operation is at least 60% of the rated braking moment.

4. The method according to claim 1, wherein, after actuation, the hydraulic brake has a rise time before reaching the predetermined braking moment, wherein the actuating the hydraulic brake before the predicted end of the yaw operation comprises actuating the hydraulic brake based on the rise time.

5. The method according to claim 4, wherein the hydraulic brake is actuated so that the hydraulic brake is at the predetermined braking moment at the predicted end of the yaw operation.

6. The method according to claim 1, wherein the predicting an end of the yaw operation comprises predicting a time for an orientation of the nacelle with respect to the tower.

7. The according to claim 1, wherein the predicting an end of the yaw operation comprises predicting a time of completion of the yaw operation or time of a nacelle orientation with respect to the tower for completion of the yaw operation at which an error between the orientation of the nacelle and a prevailing wind direction is equal to or below a threshold value.

8. The method according to claim 7, wherein the error between the orientation of the nacelle and a prevailing wind direction is based on an actual wind direction, an actual orientation of the nacelle with respect to the tower, and the speed of rotation of the nacelle.

9. The method according to claim 1, wherein the one or more yaw drives comprise a yaw motor and a motor brake, the method comprising stopping the yaw motor at the predicted end of the yaw operation.

10. The method according to claim 9, the method comprising activating the motor brake after stopping the yaw motor.

11. The method according to claim 10, comprising activating the motor brake after a predetermined delay after the predicted end of the yaw operation or after the yaw motor is stopped.

12. The method according to claim 10, further comprising determining a speed of the nacelle and activating the motor brake when the nacelle speed reaches a predetermined minimum speed threshold.

13. The method according to claim 10, further comprising determining an acceleration of the nacelle and activating the motor brake when the nacelle acceleration reaches a predetermined maximum acceleration threshold.

14. A control system for a wind turbine, wherein the control system is configured to perform the method according to claim 1.

15. A wind turbine, comprising a control system configured to perform the method according to claim 1.

* * * * *